(12) United States Patent
Kish

(10) Patent No.: US 11,070,457 B2
(45) Date of Patent: Jul. 20, 2021

(54) REMEDIAL ACTION BASED ON MONITORED WIRELESS THROUGHPUT

(71) Applicant: ARRIS Enterprises LLC, Suwanee, GA (US)

(72) Inventor: William S Kish, Saratoga, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 680 days.

(21) Appl. No.: 15/403,087

(22) PCT Filed: Jul. 18, 2014

(86) PCT No.: PCT/US2014/047316
§ 371 (c)(1),
(2) Date: Jan. 10, 2017

(87) PCT Pub. No.: WO2016/010563
PCT Pub. Date: Jan. 21, 2016

(65) Prior Publication Data
US 2017/0171052 A1 Jun. 15, 2017

(51) Int. Cl.
*H04L 5/00* (2006.01)
*H04W 72/04* (2009.01)
(Continued)

(52) U.S. Cl.
CPC .......... *H04L 43/0888* (2013.01); *H04L 43/16* (2013.01); *H04W 24/02* (2013.01); *H04W 24/04* (2013.01)

(58) Field of Classification Search
CPC . H04W 52/146; H04W 52/267; H04W 52/26; H04W 52/24; H04W 28/22;
(Continued)

(56) References Cited

U.S. PATENT DOCUMENTS 6,426,942 B1  7/2002  Sienel ......................... 370/235
8,503,997 B2  8/2013  Razoumov ................ 455/414.3
(Continued)

OTHER PUBLICATIONS

International Search Report and Written Opinion for PCT/US2014/047316, dated Mar. 26, 2015.

*Primary Examiner* — Sai Aung
(74) *Attorney, Agent, or Firm* — Steven Stupp; Stewart Wiener

(57) ABSTRACT

In order to maintain performance during wireless communication, a transmitting electronic device may selectively perform a remedial action based on a monitored throughput. In particular, the transmitting electronic device may monitor communication with one or more receiving electronic devices, and may calculate a throughput metric based on the monitored communication. For example, the transmitting electronic device may monitor data rates, may receive feedback about the communication from at least one of the receiving electronic devices, and may determine an observed distribution of the data rates. Then, the transmitting electronic device may compare the throughput metric to a threshold value. If the throughput metric is less than the threshold value, the transmitting electronic device may perform the remedial action. This remedial action may include: denying subsequent association requests, discontinuing an existing association; and/or notifying a cellular-telephone network that the remedial action was needed.

20 Claims, 5 Drawing Sheets

(51) Int. Cl.
*H04L 12/26* (2006.01)
*H04W 24/02* (2009.01)
*H04W 24/04* (2009.01)

(58) Field of Classification Search
CPC . H04W 52/241; H04W 52/367; H04W 52/50;
H04W 52/243; H04W 52/143
See application file for complete search history.

(56) References Cited

U.S. PATENT DOCUMENTS

| | | | | |
|---|---|---|---|---|
| 2003/0142631 | A1* | 7/2003 | Silvester | H04L 1/0001 370/252 |
| 2010/0265913 | A1* | 10/2010 | Gorokhov | H04W 36/0055 370/331 |
| 2011/0047594 | A1* | 2/2011 | Mahaffey | G06F 21/564 726/1 |
| 2013/0051388 | A1* | 2/2013 | Pantelidou | H04L 1/0002 370/390 |
| 2014/0003263 | A1* | 1/2014 | Sheriff | H04W 36/30 370/252 |

* cited by examiner

REMEDIAL ACTION BASED ON MONITORED WIRELESS THROUGHPUT

CROSS REFERENCE TO RELATED APPLICATIONS

This application claims priority under 35 U.S.C. § 371 to International Patent Application No. PCT/US14/47316, "Remedial Action Based on Monitored Wireless Throughput," by William S. Kish, filed on Jul. 18, 2014, the contents of which is herein incorporated by reference.

BACKGROUND

Field

The described embodiments relate to techniques for selectively performing a remedial action to maintain communication performance in a wireless network. In particular, the described embodiments relate to techniques for selectively changing service in the wireless network based on a performance metric.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Washington), and/or another type of wireless network.

However, the performance during wireless communication among electronic devices can vary significantly over time. In principle, providers of the electronic devices and operators of wireless networks would like to dynamically adapt the communication to address changes in performance. In practice, this is often difficult because of incomplete or inaccurate information. For example, neither the providers of the electronic devices nor the operators of the wireless networks may have the information needed to identify the cause of communication-performance degradation and, thus, may not be able to address it to dynamically improve the communication performance. The resulting variations in communication performance may degrade the user experience when using the electronic devices.

SUMMARY

The described embodiments include a transmitting electronic device. This transmitting electronic device includes: a node that can couple to an antenna; and an interface circuit, coupled to the node, which communicates with one or more receiving electronic devices. Moreover, the interface circuit: monitors the communication with one of the receiving electronic devices; calculates a throughput metric based on measurements obtained during the monitoring; compares the throughput metric to a threshold; and selectively performs a remedial action based on the comparison, where the remedial action includes denying subsequent association requests from an additional receiving electronic device.

For example, the monitoring may involve tracking data rates during the communication and receiving feedback about the communication from the one of the receiving electronic devices.

Furthermore, the calculating may involve determining an observed distribution of the data rates. Additionally, the threshold may include a target data rate associated with a percentile on the observed distribution, and the remedial action may be selectively performed if the data rate associated with the percentile on the observed distribution is less than the target data rate.

In some embodiments, the calculating involves determining utilization based on a measured data rate during the communication and an estimated data rate during the communication. In these embodiments, the threshold includes a target utilization, and the remedial action is selectively performed if the utilization is less than the target utilization.

Moreover, the remedial action may include discontinuing an association with one or more of the receiving electronic devices and/or notifying a cellular-telephone network that the remedial action was needed.

In some embodiments, the transmitting electronic device includes: a processor; and a memory, coupled to the processor, which stores a program module that is executed by the processor. The program module may include instructions for: monitoring the communication; calculating the throughput metric; comparing the throughput metric to the threshold; and selectively performing the remedial action.

Another embodiment provides a computer-program product for use with the transmitting electronic device. This computer-program product includes instructions for at least some of the operations performed by the transmitting electronic device.

Another embodiment provides a method for selectively performing the remedial action. This method includes at least some of the operations performed by the transmitting electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to maintain performance during wireless communication, a transmitting electronic device (such as an access point) may selectively perform a remedial action based on a monitored throughput. In particular, the transmitting electronic device may monitor communication with one or more receiving electronic devices, and may calculate a throughput metric based on the monitored communication. For example, the transmitting electronic device may monitor data rates and/or may receive feedback about the communication from at least one of the receiving electronic devices, and then may determine an observed distribution of the data rates. Next, the transmitting electronic device may compare the throughput metric to a threshold value (such as a target data rate associated with a percentile on the observed distribution). If the throughput metric is less than the threshold value, the transmitting electronic device may perform the remedial action. This remedial action may include: denying subsequent association requests from an additional receiving electronic device; discontinuing an existing association with one or more of the receiving electronic devices; and/or notifying a cellular-telephone network that the remedial action was needed. In these ways, the electronic device may maintain performance (such as the throughput) during the wireless communication.

In the discussion that follows the transmitting and the receiving electronic devices include radios that communicate packets in accordance with a communication protocol, such as an Institute of Electrical and Electronics Engineers (IEEE) 802.11 standard (which is sometimes referred to as 'Wi-Fi®,' from the Wi-Fi® Alliance of Austin, Tex.), Bluetooth™ (from the Bluetooth Special Interest Group of Kirkland, Washington), and/or another type of wireless interface. In the discussion that follows, Wi-Fi® is used as an illustrative example. However, a wide variety of communication protocols may be used.

Figure 1:
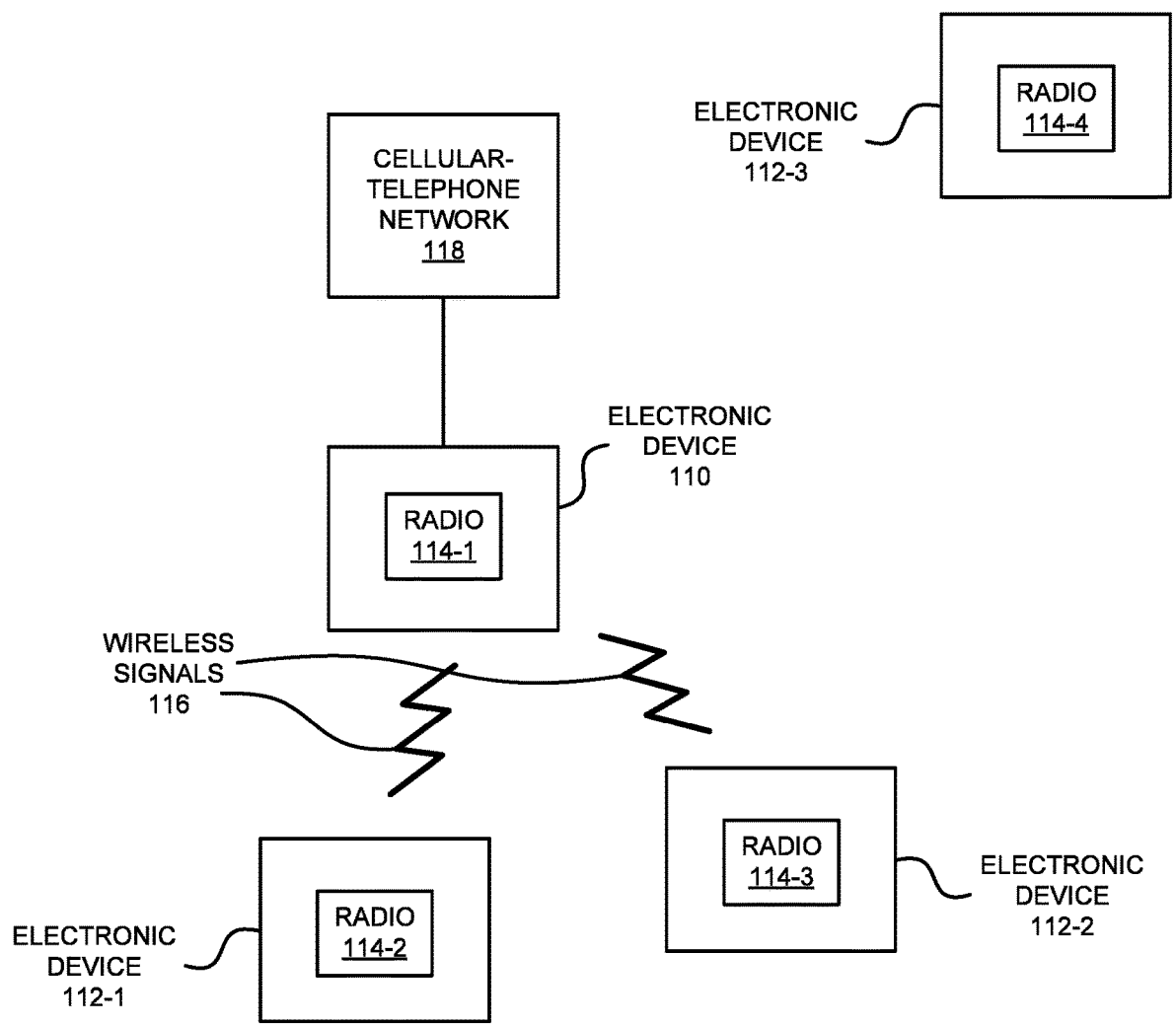
FIG. 1 is a block diagram illustrating electronic devices wirelessly communicating in accordance with an embodiment of the present disclosure.

Communication among electronic devices is shown in FIG. 1, which presents a block diagram illustrating transmitting electronic device 110 (such as an access point) and one or more receiving electronic devices 112 (such as portable electronic devices, e.g., cellular telephones) wirelessly communicating according to some embodiments. In particular, these electronic devices may wirelessly communicate while: transmitting advertising frames on wireless channels, detecting one another by scanning wireless channels, establishing connections (for example, by transmitting association requests), and/or transmitting and receiving packets (which may include the association requests and/or additional information as payloads).

Figure 5:
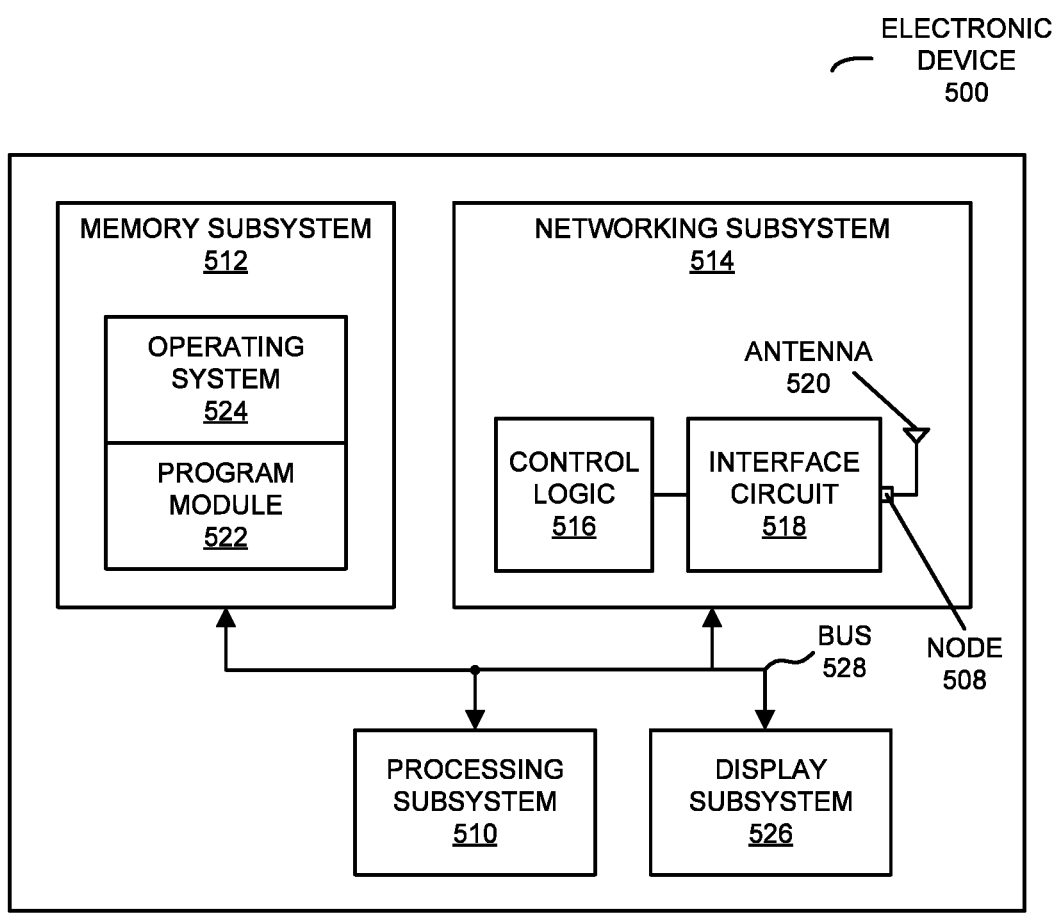
FIG. 5 is a block diagram illustrating one of the electronic devices of FIG. 1 in accordance with an embodiment of the present disclosure.

As described further below with reference to FIG. 5, transmitting electronic device 110 and the one or more receiving electronic devices 112 may include subsystems, such as a networking subsystem, a memory subsystem and a processor subsystem. In addition, transmitting electronic device 110 and the one or more receiving electronic devices 112 may include radios 114 in the networking subsystems. More generally, transmitting electronic device 110 and the one or more receiving electronic devices 112 can include (or can be included within) any electronic devices with the networking subsystems that enable transmitting electronic device 110 and the one or more receiving electronic devices 112 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 116 (represented by jagged lines) are transmitted from a radio 114-1 in transmitting electronic device 110. These wireless signals 116 are received by radios 114 in at least one of the one or more receiving electronic devices 112. In particular, transmitting electronic device 110 may transmit packets. In turn, these packets may be received by at least the one of the one or more receiving electronic devices 112. This may allow transmitting electronic device 110 to communicate information to receiving electronic devices 112. Note that the communication between transmitting electronic device 110 and a given one of receiving electronic devices 112 (such as receiving electronic device 112-1) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). In some embodiments, the communication between transmitting electronic device 110 and a given one of receiving electronic devices 112 is characterized by an error-rate model, which compares the error rate during communication at the data rate.

However, a performance during the communication may change, e.g., there may be too many receiving electronic devices 112 associated with transmitting electronic device 110, the amount of information that transmitting electronic device 110 needs to communicate with the one or more receiving electronic devices 112 may exceed the capacity, there may be interference or movement, and/or there may be another factor that may affects the performance. This may result in a degradation in the performance, which, in turn, may increase the number of packets that are resent and, thus, may increase the latency of the communication and may degrade the experience of users of receiving electronic devices 112.

In order to address this problem, transmitting electronic device 110 may implement communication techniques, one of which is described further below with reference to FIG. 2. In particular, transmitting electronic device 110 may monitor the communication with at least one of receiving electronic devices 112. Based on measurements obtained during the monitoring, transmitting electronic device 110 may calculate a throughput metric. For example, transmitting electronic device 110 may track data rates during the communication (which may be specified by interface circuits in transmitting electronic device 110 and the one or more receiving electronic devices 112) and may receive feedback about the communication from at least the one of receiving electronic devices 112 (such as whether packets were successfully received based on acknowledgment messages). Moreover, as described further below with reference to FIG. 3, transmitting electronic device 110 may determine an observed distribution of the data rates (such as data rate as a function of percentage or percentile of the communication, e.g., 5% of the communicated packets, etc.), which is an illustration of the throughput metric. Alternatively or additionally, the throughput metric determined by transmitting electronic device 110 may be the ratio of the measured data rate during the communication to an estimated data rate during the communication. Thus, the throughput metric may be the utilization, e.g., the ratio of the data rate during successful communication of packets (as indicated by acknowledgment messages) to the estimated data rate of the communication channel or link. Note that the estimated data rate may be the estimated maximum data rate or throughput as determined using the error-rate model for the communication.

Then, transmitting electronic device 110 may compare the throughput metric to a threshold. For example, when the throughput metric is based on the observed distribution, the threshold may be a target data rate associated with a percentile on the observed distribution, such as a data rate or throughput of 10 kbps for the $50^{th}$ percentile in the observed distribution. Alternatively or additionally, when the throughput metric is the utilization, the threshold may be a target utilization, such as 90%.

Next, transmitting electronic device 110 may selectively perform a remedial action based on the comparison. For example, if the throughput metric is less than the threshold (e.g., the data rate at the percentile on the observed distribution is less than or below the target data rate and/or the utilization is less than or below the target utilization), transmitting electronic device 110 may perform the remedial action.

Moreover, the remedial action may include: denying subsequent association requests from an additional receiving electronic device (such as receiving electronic device 112-3), which is not currently associated with transmitting electronic device 110. For example, transmitting electronic device 110 may ignore new probe or association requests from un-associated clients or stations. Alternatively or additionally, the remedial action may include discontinuing an association with one or more of receiving electronic devices 112 (thus, transmitting electronic device 110 may discontinue communicating information or data to receiving electronic device 112-2). In particular, transmitting electronic device 110 may send a basic-service-set transition message to previously associated clients or stations. In some embodiments, transmitting electronic device 110 notifies a cellular-telephone network 118 that the remedial action was needed. This may allow cellular-telephone network 118 to provide feedback to a provider of transmitting electronic device 110 or an operator of the wireless network that includes transmitting electronic device 110, and/or to transfer one or more of receiving electronic devices 112 to another wireless network. More generally, the remedial action may allow dynamic service-related processing of the coverage area provided by transmitting electronic device 110 based on the throughput.

In the described embodiments, processing a packet or frame in transmitting electronic device 110 and/or the one or more receiving electronic devices 112 includes: receiving wireless signals 116 with the packet or frame; decoding/extracting the packet or frame from received wireless signals 116 to acquire the packet or frame; and processing the packet or frame to determine information contained in the packet or frame (such as the feedback about the performance during the communication).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
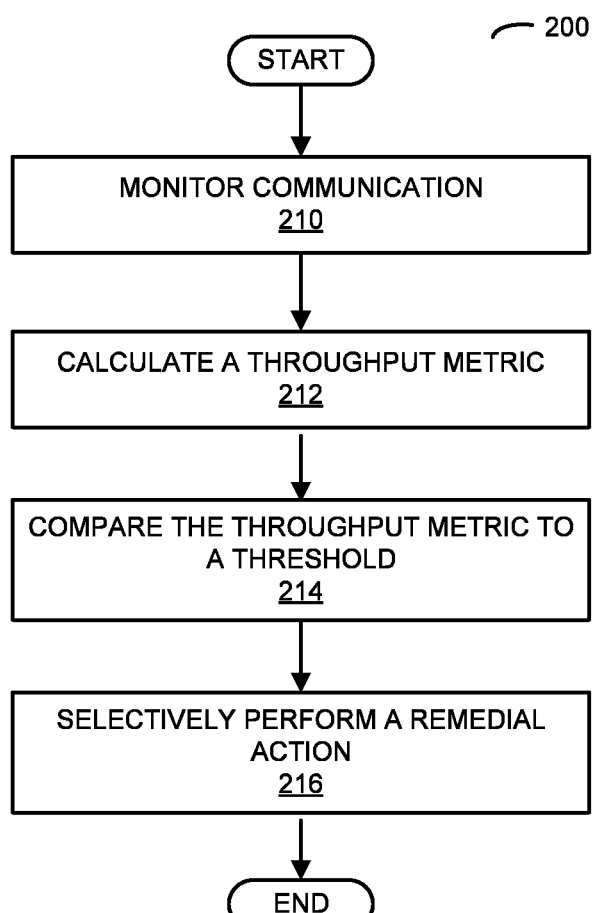
FIG. 2 is a flow diagram illustrating a method for selectively performing a remedial action during communication among the electronic devices in FIG. 1 in accordance with an embodiment of the present disclosure.

FIG. 2 presents embodiments of a flow diagram illustrating method 200 for selectively performing a remedial action that may be performed by a transmitting electronic device, such as transmitting electronic device 110 (FIG. 1). During operation, the transmitting electronic device monitors communication (operation 210) between the transmitting electronic device and one of a set of receiving electronic devices. Then, the transmitting electronic device calculates a throughput metric (operation 212) based on measurements obtained during the monitoring. Moreover, the transmitting electronic device compares the throughput metric to a threshold (operation 214). Next, the transmitting electronic device selectively performs the remedial action (operation 216) based on the comparison, where the remedial action includes denying subsequent association requests from an additional receiving electronic device.

In these ways, the transmitting electronic device (for example, an interface circuit, a driver and/or software executed in an environment of the transmitting electronic device) may facilitate communication with the one or more receiving electronic devices. In particular, the transmitting electronic device may perform the remedial action to maintain the throughput metric. This may reduce latency and, thus, may improve the user experience when communicating via the transmitting electronic device.

In some embodiments of method 200 (FIG. 2), there may be additional or fewer operations. Moreover, the order of the operations may be changed, and/or two or more operations may be combined into a single operation.

As noted previously, in some embodiments the throughput metric is based on an observed distribution of the data rate during the wireless communication. For example, the observed distribution may be sorted (such as percentile ranks of the observed distribution). In the discussion that follows, a histogram is used as an illustrative example of a sorted observed distribution with reduced memory consumption. However, the observed distribution may be other than a histogram. Note that, in general, an 'observed distribution' may include a collection of observed value samples from a random process (e.g., monitored throughput) that may be sorted from best to worst (or visa versa). Moreover, the observed value samples may be decimated (e.g., every other value or, more generally, 1/N values may be removed from the sorted list, where N is an integer) to bound the size of the observed distribution without sacrificing statistical information.

Figure 3:
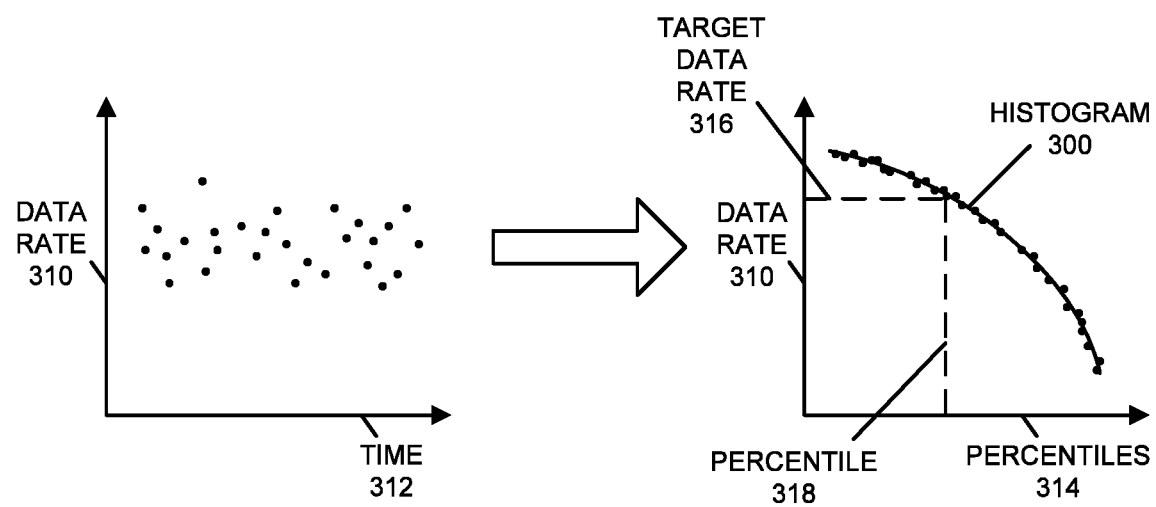
FIG. 3 is a drawing illustrating an observed distribution of throughput during communication among the electronic devices in FIG. 1 in accordance with an embodiment of the present disclosure.

Determination of a histogram is shown in FIG. 3, which presents drawing illustrating a histogram 300 of data rates 310 as a function of percentiles 314 during communication among electronic devices (such as transmitting electronic device 110 and one or more of receiving electronic devices 112 in FIG. 1) according to some embodiments. In particular, transmitting electronic device 110 may track data rates 310 as a function of time 312 during the communication. Then, transmitting electronic device 110 may sort the tracked data rates 310 from best to worst and may bin the results in percentiles 314 to determine histogram 300. (Note that the results may be stored in memory, such as memory subsystem 512 in FIG. 5.) As shown in FIG. 3, the threshold in method 200 (FIG. 2) may represent a target data rate 316 at a particular percentile 318.

Figure 4:
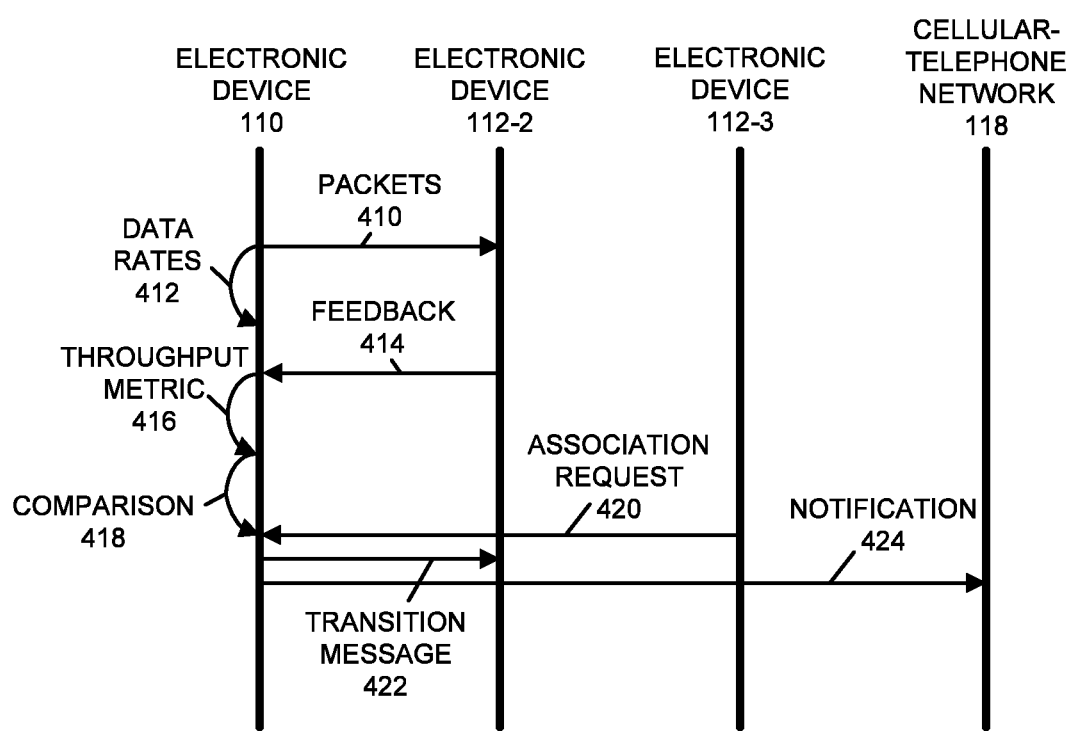
FIG. 4 is a drawing illustrating communication among the electronic devices in FIG. 1 in accordance with an embodiment of the present disclosure.

Embodiments of the communication technique are further illustrated in FIG. 4, which presents a drawing illustrating communication between transmitting electronic device 110 and one or more of receiving electronic devices 112 (FIG. 1). In particular, transmitting electronic device 110 may communicate packets 410 with receiving electronic device 112-2. During embodiments of the communication technique, transmitting electronic device 110 may track data rates 412. In addition, transmitting electronic device 110 may receive feedback 414 about the communication (such as acknowledgment messages) from receiving electronic device 112-2.

Then, transmitting electronic device 110 may determine or calculate the throughput metric 416, and may compare 418 the throughput metric to the threshold. Based on this comparison, transmitting electronic device 110 may selectively perform the remedial action. For example, transmitting electronic device 110 may deny an association request 420 from receiving electronic device 112-3 (which may include ignoring association request 420). Alternatively or additionally, transmitting electronic device 110 may disassociate from receiving electronic device 112-2 and provide a transition message 422 to receiving electronic device 112-2 (which may inform receiving electronic device 112-2 to seek service elsewhere) and/or a notification 424 to cellular-telephone network 118 (e.g., to ask cellular-telephone network 118 to pick up the connection with receiving electronic device 112-2).

We now describe embodiments of the electronic device. FIG. 5 presents a block diagram illustrating an electronic device 500, such as transmitting electronic device 110 or one of receiving electronic devices 112 in FIG. 1. This electronic device includes processing subsystem 510, memory subsystem 512, and networking subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and an antenna 520. (While FIG. 5 includes antenna 520, in some embodiments electronic device 500 includes one or more nodes, such as node 508, e.g., a pad, which can be coupled to antenna 520. Thus, electronic device 500 may or may not include antenna 520.) For example, networking subsystem 514 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a consumer-electronic device, a portable computing device, an access point, a router, a switch, communication equipment, test equipment, and/or another electronic device.

Although specific components are used to describe electronic device 500, in alternative embodiments, different components and/or subsystems may be present in electronic device 500. For example, electronic device 500 may include one or more additional processing subsystems 510, memory subsystems 512, networking subsystems 514, and/or display subsystems 526. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments, some or all of a given subsystem or component can be integrated into one or more of the other subsystems or component(s) in electronic device 500. For example, in some embodiments program module 522 is included in operating system 524.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as a radio. Moreover, the integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, calculating the throughput metric, etc.)

While a communication protocol compatible with Wi-Fi® was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) or in firmware in interface circuit 518. Alternatively or additionally, at least some of the operations in the communication technique may be implemented in a physical layer, such as hardware in interface circuit 518.

Moreover, while the preceding embodiments illustrated the use of the communication technique and method 200 (FIG. 2) in transmitting electronic device 110 (FIG. 1), in other embodiments the remedial action is performed: system-wide, per radio, per wireless network, per client, etc. Thus, at least some of the operations in the communication technique and method 200 (FIG. 2) may be performed by a remote electronic device or server. For example, the remedial action may be performed system-wide (such as for multiple transmitting electronic devices) by a central server.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A transmitting electronic device, comprising:
   an antenna; and
   an interface circuit, coupled to the antenna, configured to wirelessly communicate with one or more receiving electronic devices, wherein the interface circuit is configured to:
   monitor, at one or more nodes of the transmitting electronic device, the wireless communication with one of the receiving electronic devices in a wireless local area network, wherein the wireless communication is compatible with an IEEE 802.11 communication protocol;
   calculate a throughput metric based on measurements obtained during the monitoring, the calculating comprises determining an observed distribution of data rates;
   compare the throughput metric to a threshold; and
   selectively perform a remedial action based on the comparison, wherein the remedial action comprises denying subsequent association requests from an additional receiving electronic device.

2. The transmitting electronic device of claim 1, wherein the remedial action further comprises discontinuing an association with one or more of the receiving electronic devices.

3. The transmitting electronic device of claim 1, wherein the monitoring comprises tracking, at the one or more nodes, data rates during the wireless communication and receiving, from the one or more nodes, feedback about the wireless communication from the one of the receiving electronic devices.

4. The transmitting electronic device of claim 1, wherein the threshold comprises a target data rate associated with a percentile on the observed distribution; and
   wherein the remedial action is selectively performed if the data rate associated with the percentile on the observed distribution is less than the target data rate.

5. The transmitting electronic device of claim 1, wherein the calculating comprises determining utilization based on a measured data rate during the wireless communication and an estimated data rate during the wireless communication.

6. The transmitting electronic device of claim 5, wherein the threshold comprises a target utilization; and
   wherein the remedial action is selectively performed if the utilization is less than the target utilization.

7. The transmitting electronic device of claim 1, wherein the remedial action further comprises notifying, to the one or more nodes, a cellular-telephone network that the remedial action was needed.

8. The transmitting electronic device of claim 1, wherein the transmitting electronic device further comprises:
   a processor; and a memory, coupled to the processor, which stores program instructions configured to be executed by the processor, wherein, when executed by the processor, the program instructions cause the transmitting electronic device to:
monitor, at the one or more nodes, the wireless communication;
calculate the throughput metric;
compare the throughput metric to the threshold; and
selectively perform the remedial action.

9. A non-transitory computer-readable storage medium for use in conjunction with a transmitting electronic device, the computer-readable storage medium storing program instructions that, when executed by the transmitting electronic device, cause the transmitting electronic device to:
monitor, at one or more nodes of the transmitting electronic device, wireless communication between a transmitting electronic device and one of a set of receiving electronic devices in a wireless local area network, wherein the wireless communication is compatible with an IEEE 802.11 communication protocol;
calculate a throughput metric based on measurements obtained during the monitoring, the calculating comprises determining an observed distribution of data rates;
compare the throughput metric to a threshold; and
selectively perform the remedial action based on the comparison, wherein the remedial action comprises denying subsequent association requests from an additional receiving electronic device.

10. The computer-readable storage medium of claim 9, wherein the monitoring comprises tracking, at the one or more nodes, data rates during the wireless communication and receiving, from the one or more nodes, feedback about the wireless communication from the one of the receiving electronic devices.

11. The computer-readable storage medium of claim 9, wherein the threshold comprises a target data rate associated with a percentile on the observed distribution; and
wherein the remedial action is selectively performed if the data rate associated with the percentile on the observed distribution is less than the target data rate.

12. The computer-readable storage medium of claim 9, wherein the calculating comprises determining utilization based on a measured data rate during the wireless communication and an estimated data rate during the wireless communication.

13. The computer-readable storage medium of claim 12, wherein the threshold comprises a target utilization; and
wherein the remedial action is selectively performed if the utilization is less than the target utilization.

14. The computer-readable storage medium of claim 9, wherein the remedial action further comprises notifying, to the one or more nodes, a cellular-telephone network that the remedial action was needed.

15. A method for selectively performing a remedial action to maintain communication performance in a wireless network, wherein the method comprises:
by a transmitting electronic device:
monitoring, at one or more nodes of the transmitting electronic device, wireless communication between the transmitting electronic device and one of receiving electronic devices in a wireless local area network, wherein the wireless communication is compatible with an IEEE 802.11 communication protocol;
using the transmitting electronic device, calculating a throughput metric based on measurements obtained during the monitoring, the calculating comprises determining an observed distribution of data rates;
comparing the throughput metric to a threshold; and
selectively performing the remedial action based on the comparison, wherein the remedial action comprises denying subsequent association requests from an additional receiving electronic device.

16. The method of claim 15, wherein the monitoring comprises tracking, at the one or more nodes, data rates during the wireless communication and receiving, from the one or more nodes, feedback about the wireless communication from the one of the receiving electronic devices.

17. The method of claim 15, wherein the calculating comprises determining an observed distribution of data rates;
wherein the threshold comprises a target data rate associated with a percentile on the observed distribution; and
wherein the remedial action is selectively performed if the data rate associated with the percentile on the observed distribution is less than the target data rate.

18. The method of claim 15, wherein the calculating comprises determining utilization based on a measured data rate during the wireless communication and an estimated data rate during the wireless communication.

19. The method of claim 18, wherein the threshold comprises a target utilization; and
wherein the remedial action is selectively performed if the utilization is less than the target utilization.

20. The method of claim 15, wherein the remedial action further comprises notifying, to the one or more nodes, a cellular-telephone network that the remedial action was needed.

* * * * *